United States Patent
Guinther et al.

(10) Patent No.: US 7,332,001 B2
(45) Date of Patent: Feb. 19, 2008

(54) METHOD OF ENHANCING THE OPERATION OF DIESEL FUEL COMBUSTION SYSTEMS

(75) Inventors: Gregory H. Guinther, Richmond, VA (US); Mark T. Devlin, Richmond, VA (US); Joseph W. Roos, Mechanicsville, VA (US); David M. Human, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 466 days.

(21) Appl. No.: 10/677,787

(22) Filed: Oct. 2, 2003

(65) Prior Publication Data

US 2005/0072041 A1    Apr. 7, 2005

(51) Int. Cl.
C10L 1/18 (2006.01)
C10L 1/22 (2006.01)

(52) U.S. Cl. .......................... 44/354; 44/355; 44/358; 44/363; 44/365; 44/366

(58) Field of Classification Search .......... 44/354–363, 44/365, 366
See application file for complete search history.

(56) References Cited

U.S. PATENT DOCUMENTS

| | | | |
|---|---|---|---|
| 2,088,775 A | 7/1937 | Lyons et al. | |
| 2,151,432 A | 3/1939 | Lyons et al. | |
| 2,818,417 A | 12/1957 | Brown et al. | |
| 3,348,932 A | 10/1967 | Kukin | |
| 4,036,605 A | 7/1977 | Hartle | |
| 4,104,036 A | 8/1978 | Chao et al. | |
| 4,139,349 A | 2/1979 | Payne | |
| 4,175,927 A | 11/1979 | Niebylski | |
| 4,207,078 A | 6/1980 | Sweeney et al. | |
| 4,222,746 A | 9/1980 | Sweeney et al. | |
| 4,240,801 A | 12/1980 | Desmond | |
| 4,266,946 A | 5/1981 | Niebylski | |
| 4,317,657 A | 3/1982 | Niebylski | |
| 4,390,345 A | 6/1983 | Somorjai | |
| 4,474,580 A | 10/1984 | MacKenzie et al. | |
| 4,568,357 A | 2/1986 | Simon | |
| 4,588,416 A | 5/1986 | Zaweski et al. | |
| 4,664,677 A | 5/1987 | Dorer, Jr. et al. | |
| 4,670,020 A | 6/1987 | Rao | |
| 4,674,447 A | 6/1987 | Davis | |
| 4,804,388 A | 2/1989 | Kukin | |
| 4,891,050 A | 1/1990 | Bowers et al. | |
| 4,908,045 A | 3/1990 | Farrar | |
| 4,946,609 A | 8/1990 | Pruess et al. | |
| 4,955,331 A | 9/1990 | Hohr et al. | |
| 5,034,020 A | 7/1991 | Epperly et al. | |
| 5,075,383 A | 12/1991 | Migdal et al. | |
| 5,113,803 A | 5/1992 | Hollran et al. | |
| 5,340,369 A | 8/1994 | Koch et al. | |
| 5,376,154 A | 12/1994 | Daly et al. | |
| 5,501,714 A | 3/1996 | Valentine et al. | |
| 5,551,957 A | 9/1996 | Cunningham et al. | |
| 5,584,894 A | 12/1996 | Peter-Hoblyn et al. | |
| 5,599,357 A | 2/1997 | Leeper | |
| 5,679,116 A | 10/1997 | Cunningham et al. | |
| 5,732,548 A | 3/1998 | Peter-Hoblyn | |
| 5,758,496 A | 6/1998 | Rao et al. | |
| 5,809,774 A | 9/1998 | Peter-Hoblyn et al. | |
| 5,809,775 A | 9/1998 | Tarabulski et al. | |
| 5,813,224 A | 9/1998 | Rao et al. | |
| 5,819,529 A | 10/1998 | Peter-Hoblyn | |
| 5,912,190 A | 6/1999 | Barr et al. | |
| 5,919,276 A | 7/1999 | Jeffrey | |
| 5,924,280 A | 7/1999 | Tarabulski | |
| 5,928,392 A | 7/1999 | Aradi | |
| 5,944,858 A | 8/1999 | Wallace | |
| 5,953,906 A | 9/1999 | Gamel et al. | |
| 5,976,475 A | 11/1999 | Peter-Hoblyn et al. | |
| 6,003,303 A | 12/1999 | Peter-Hoblyn et al. | |
| 6,023,928 A | 2/2000 | Peter-Hoblyn et al. | |
| 6,039,772 A | 3/2000 | Orr | |
| 6,051,040 A | 4/2000 | Peter-Hoblyn | |
| 6,056,792 A | 5/2000 | Barr et al. | |
| 6,107,257 A | 8/2000 | Valcho et al. | |
| 6,152,972 A | 11/2000 | Shustorovich et al. | |

(Continued)

FOREIGN PATENT DOCUMENTS

CA     2 268 482     6/2003

(Continued)

OTHER PUBLICATIONS

Ford Diesel Website www.thedieselstop.com/archives/abol/PWRSTRK$/messages/$WEBMSG0000000005EFBEDE39.*

(Continued)

*Primary Examiner*—Cephia D. Toomer
(74) *Attorney, Agent, or Firm*—John H. Thomas, P.C.

(57) ABSTRACT

A method of enhancing the operation of diesel fuel combustion systems in a combustion system includes supplying a fuel and additive that includes a manganese compound to a diesel fuel combustion system. The fuel is then combusted in the combustion chamber to produce at least one byproduct including the manganese compound. The manganese compound is supplied in an amount effective to complex with the combustion byproduct. The diesel fuel combustion system operation is enhanced by improving the attributes of lubricating oil loaded with the combustion byproduct soot particles.

16 Claims, No Drawings

U.S. PATENT DOCUMENTS

| | | |
|---|---|---|
| 6,193,767 B1 | 2/2001 | Arters et al. |
| 6,200,358 B1 | 3/2001 | Fleischer et al. |
| 6,206,685 B1 | 3/2001 | Zamansky et al. |
| 6,361,754 B1 | 3/2002 | Peter-Hoblyn et al. |
| 6,401,692 B1 * | 6/2002 | Grieshaber et al. ......... 123/456 |
| 2002/0112466 A1 | 8/2002 | Roos et al. |
| 2003/0177758 A1 | 9/2003 | Roos et al. |

FOREIGN PATENT DOCUMENTS

| | | |
|---|---|---|
| CA | 2 437 157 A1 | 8/2003 |
| EP | 78249 * | 5/1983 |
| EP | 0 507 510 A1 | 10/1992 |
| EP | 0 476 197 B1 | 1/1994 |
| EP | 0 466 512 B1 | 6/1994 |
| EP | 0 468 674 B1 | 10/1994 |
| EP | 0 667 387 A2 | 8/1995 |
| EP | 0668 899 B1 | 9/2000 |
| EP | 1 215 272 A1 | 6/2002 |
| EP | 1 368 444 A1 | 12/2003 |
| EP | 1 411 108 A1 | 4/2004 |
| GB | 1 413 323 | 11/1975 |
| GB | 2 239 258 A | 6/1991 |
| JP | 58040390 | 3/1983 |
| JP | 2002530578 | 9/2002 |
| JP | 2004138049 | 5/2004 |
| RU | 2087731 | 8/1997 |
| RU | 2178338 | 1/2002 |
| SU | 1740749 | 6/1992 |
| WO | WO 85/01513 A1 | 4/1985 |
| WO | WO 87/00193 A1 | 1/1987 |
| WO | WO 95/23836 A1 | 9/1995 |
| WO | WO 00/30739 A1 | 6/2000 |
| WO | WO 02/48293 A1 | 6/2002 |

OTHER PUBLICATIONS

Canadian Intellectual Property Office, Written Reply dated Jan. 19, 2007.

Arakawa, Kenji; Matsuda, Satoshi; and Kinoshita, Hiroo; Progress in Sulfur Poisoning Resistance of Lean NOx Catalysts; SAE [Tech Pap.] 980930, pp. 111-118.

Dearth, Mark A.; Hepburn, Jeffrey S.; Thanasiu, Eva; McKenzie, JoAnne; Home, Scott G.; Sulfur Interaction with Lean Nox Traps: Laboratory and Engine Dynamometer Studies; SAE [Tech Pap.] 982595, 1998, pp. 1-9.

Aradi, Allen A.; Roos, Joseph W.; Fort, Jr., Ben F.; Lee, Thomas E.; and Davidson, Robert I.; The Physical and Chemical Effect of Manganese Oxides on Automobile Catalytic Converters; SAE [Tech Pap.] 940747, pp. 207-218.

Bailie, J. D.; Michalski, G. W.; Unzelman, G. H., MMT-A Versatile Antiknock; Natl. Pet. Refiners Assoc., [Tech Pap.], AM-78-36, pp. 1-20.

Valentine, James M.; Peter-Hoblyn, Jeremy D.; and Acres, G.K., Emissions Reduction and Improved Fuel Economy Performance from a Bimetallic Platinum/Cerium Diesel Fuel Additive at Ultra-Low Dose Rates; SAE [Tech Pap.], 2000-01-1934, pp. 1-9.

Guinther, Greg H.; Human, David M.; Miller, Keith T.; Roos, Joseph W.; and Schwab, Scott D.; The Role that Methylcyclopentadienyl Manganese Tricarbonyl (MMT®) Can Play in Improving Low-Temperature Performance of Diesel Particulate Traps; SAE [Tech Pap.], 2002-01-2728, pp. 1-9.

Nelson, A.J.; Ferreira, J.L.; Reynolds, J.G.; Schwab, S.D.; and Roos, J.W.; X-Ray Absorption Characterization of Diesel Exhaust Particulates; Article in Materials Research Society Symposium Proceedings, vol. 590, 2000, pp. 63-69.

Devlin, M. et al., "Film Formation Properties of Polymers in the Presence of Abrasive Contaminants," SAE Technical Paper 2002-01-2793, Oct. 21, 2002.

Faix, Louis J.; A study if the Effects of Manganese Fuel Additive on Automotive Emissions; SAE [Tech Pap.], 780002, pp. 1-12.

Fekete, Nicholas; Gruden, Igor; Voigtlander, Dirk; Nester, Ulrich; Krutzsch, Bernd; Willand, Jurgen; and Kuhn, Michael; Advanced Engine Control and Exhaust Gas Aftertreatment of a Leanburn SI Engine; SAE [Tech Pap.] 972873; pp. 1-10.

Valentine, James M.; Clean Diesel Technologies Inc. Announces Test Results of Platinum/Cerium Diesel Fuel Additive; 203/327-7050, article in Diesel/Net News; Sep. 20, 2002, pp. 1-2.

Eastwood, Peter; Critical Topics in Exhaust Gas Aftertreatment; Research Studies Press Ltd. (2000), pp. 215-218.

Lenane, D. L.; Effect of MMT on Emissions from Production Cars; SAE [Tech Pap.], 780003, pp. 1-20.

Lenane, D. L.; Effect of a Fuel Additive on Emission Control Systems; sae [Tech Pap.] 902097, pp. 1-17.

Farrauto, Robert J.; Mooney, John J.; Effects of Sulfur on Performance of Catalytic Aftertreatment Devices; SAE [Tech Pap.] 920557, pp. 1-7.

Jelles, S.J.; Makkee, M.; Moulijn, J.A.; Acres, G.J.K.; and Peter-Hoblyn, J.D., Diesel Particulate Control. Application of an Activated Particulate Trap in Combination with Fuel Additives at an Ultra Low Dose Rate; SAE [Tech Pap.], 1999-01-0113, pp. 1-6.

Eolys™ Fuel-Borne Catalyst for Diesel Particulates Abatement: A Key Component of an Integrated System, DieselNet Technical Report, Sep. 1999, pp. 1-9.

Guyon, M.; Blejean, F.; Bert, C.; LeFaou, PH.; Impact of Sulfur on Nox Trap Catalyst Activity-Study of the Regeneration Conditions; SAE [Tech Pap.] 982607, pp. 87-95.

Original and translation of Notice of Reasons fro Rejection; Japanese Patent Application No. 278298/04; Examiner Nobuhira Yamamoto; 8 pages; Date of Dispatch. Jul. 31, 2007.

* cited by examiner

METHOD OF ENHANCING THE OPERATION OF DIESEL FUEL COMBUSTION SYSTEMS

FIELD OF THE INVENTION

The present invention relates to the use of a fuel additive for protecting and improving operation of diesel fuel combustion systems. The additive contains one or more manganese compounds. The additive can be introduced into a combustion chamber as part of the fuel. The additive will then enhance the operation of diesel fuel combustion systems by improving, for example, wear inhibition, lubricant oil life, and fuel economy.

DESCRIPTION OF THE PRIOR ART

It is well known in the automobile industry, or any industry where hydrocarbonaceous fuels are burned, to reduce tailpipe (or smokestack) emissions by using various strategies. For example, the most common method for reducing emissions from spark ignition engines is by careful control of the air-fuel ratio and ignition timing. Retarding ignition timing from the best efficiency setting reduces HC and $NO_x$ emissions, while excessive retard of ignition increases the output of CO and HC. Increasing engine speed reduces HC emissions, but $NO_x$ emissions increase with load. Increasing coolant temperature tends to reduce HC emissions, but this results in an increase in $NO_x$ emissions.

Diesel systems raise a further set of challenges for emissions control. Strategies for reducing particulate and HC include optimizing fuel injection and air motion, effective fuel atomization at varying loads, control of timing of fuel injection, minimization of parasitic losses in combustion chambers, low sac volume or valve cover orifice nozzles for direct injection, reducing lubrication oil contributions, and rapid engine warm-up.

New diesel fuel combustion systems have been and are being engineered to improve various performance attributes. Some new types of technology to be employed may include one or more of the following: improved turbochargers, fuel injections systems, electronic engine controls, low friction coatings on engine surfaces, and exhaust gas recirculation apparatuses. Many of these systems in turn result in new performance requirements and trade-offs in the overall engine operation. For example, exhaust gas recirculation (EGR) systems result in increased combustion byproduct blowby which means increased soot in engine oils. In other words, a trade-off in the use of EGR systems is that diesel engine lubricants can be expected to have a relatively higher soot content. Other types of technologies likewise result in diesel engine lubricating oils having relatively high soot content.

DETAILED DESCRIPTION

The additives used in the methods described herein are inorganic or organometallic manganese-containing compounds soluble in fuels. This fuel is then combusted in a diesel fuel combustion system to produce combustion byproducts including the manganese compound.

A method of enhancing the operation of a diesel fuel combustion system comprises supplying a diesel fuel comprising an additive that includes a manganese-containing compound to a diesel fuel combustion chamber in a diesel fuel combustion system, combusting the fuel in the combustion chamber to produce at least one byproduct comprising the manganese-containing compound, the manganese-containing compound being supplied in an amount effective to complex with the at least one combustion byproduct, wherein the diesel fuel combustion system comprises an engine oil and at least 3% mass, soot loading, whereby the diesel fuel combustion system performance is enhanced.

The diesel fuel combustion systems that may benefit from the present invention include all combustion engines that burn diesel fuels. By "combustion system" herein is meant any and all internal and external combustion devices, machines, engines, turbine engines, boilers, incinerators, evaporative burners, stationary burners and the like which can combust or in which can be combusted a diesel fuel. In one example, the diesel fuel combustion system requires an engine oil formulated to accommodate at least 3% mass, soot loading. (Heavy-duty engine oils formulated to meet the API CH-4 must prevent wear in the presence of at least 3% mass, soot loading.) In another example, the engine oil is formulated to accommodate at least about 5% mass, soot loading.

Diesel fuel combustion systems are being engineered to incorporate one or more new components which may result in the accumulation of new, high mass levels of soot loading in engine lubricating oils. The new components may also demand increased engine wear, lubricant performance. These diesel fuel combustion system components include, but are not limited to, the following: exhaust gas recirculation systems, either hot or cooled; variable-scroll turbochargers/variable geometry turbochargers; common-rail fuel injection systems; hydraulically-activated electronically-controlled unit injectors; turbocharged and after cooled combustion air systems; elevated mean fuel injection pressure and injection rate shaping capable systems; electronic engine control systems for combustion air, fuel and exhaust; variable valve actuation systems; homogenous charge compression ignition systems; and low friction coatings (e.g., carbon-based and PTFE) on engine surfaces.

The new components for diesel fuel combustion systems each contribute in their own unique way to the efficiencies and performance of the overall system. Several tradeoffs resulting from their use may include increased soot loading in the engine lubricant oil and increased lubricant performance with respect to engine wear (and new component wear).

By "diesel fuel" herein is meant one or more fuels selected from the group consisting of diesel fuel, biodiesel, biodiesel-derived fuel, synthetic diesel, diesel fuel treated with oxygenates for particulate control, and mixtures thereof and other products meeting the definitions of ASTM D975. In one example, the sulfur content of the diesel fuel would be less than about 100 ppm, and in a further example, the sulfur content would be less than about 30 ppm.

The metal disclosed herein includes elemental and ionic manganese, precursors thereof, and mixtures of metal compounds including manganese. These manganese-containing compounds may be either inorganic or organic. Also effective is the generation, liberation or production in situ of manganese or manganese ions.

Inorganic manganese-containing compounds of the present invention can include by example and without limitation fluorides, chlorides, bromides, iodides, oxides, nitrates, sulfates, phosphates, nitrides, hydrides, hydroxides, carbonates and mixtures thereof. Manganese sulfates and phosphates will be operative and may, in certain fuels and combustion applications, not present unacceptable additional sulfur and phosphorus combustion byproducts. Organometallic compounds include manganese compounds with alcohols, aldehydes, ketones, esters, anhydrides, sulfonates, phosphonates, chelates, phenates, crown ethers, naphthanates, carboxylic acids, amides, acetyl acetonates, and mixtures thereof as part of the ligand systems.

In one example, manganese-containing organometallic compounds are manganese tricarbonyl compounds. Such compounds are taught, for example, in U.S. Pat. Nos. 4,568,357; 4,674,447; 5,113,803; 5,599,357; 5,944,858 and European Patent No. 466 512 B1.

Suitable manganese tricarbonyl compounds which can be used include cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and the like, including mixtures of two or more such compounds. One example includes the cyclopentadienyl manganese tricarbonyls which are liquid at room temperature such as methylcyclopentadienyl manganese tricarbonyl, ethylcyclopentadienyl manganese tricarbonyl, liquid mixtures of cyclopentadienyl manganese tricarbonyl and methylcyclopentadienyl manganese tricarbonyl, mixtures of methylcyclopentadienyl manganese tricarbonyl and ethylcyclopentadienyl manganese tricarbonyl, etc.

Preparation of such compounds is described in the literature, for example, U.S. Pat. No. 2,818,417, the disclosure of which is incorporated herein in its entirety.

When formulating additives to be used in the methods and systems of the present invention, the manganese-containing compounds are employed in amounts sufficient to enhance the operation of diesel fuel combustion systems like those described herein. The amount or concentration of the additive may be selected based on the specific components incorporated into the particular combustion system and how those components affect, for instance, the amount of soot that the components cause to be loaded into the lubricating oil used in the operation of the combustion system. The amount or concentration of the additive may also be selected based on the concentration of sulfur in the diesel fuel. Exemplary treatment rates of the manganese compound can be in excess of 100 mg of manganese/liter, up to about 50 mg/liter, and in one example about 5 to about 30 mg/liter.

The additive disclosed herein results in reduced total mass of soot produced. Additionally, however, the additive improves the quality of the soot particles, at least with respect to the soot particles' effect on diesel engine lubricating oils. Manganese-containing additives reduce the proportion of elemental carbon (EC) relative to the soluble organic fraction (SOF). This ratio of EC to SOF is believed to affect the hardness of soot particles, thereby affecting film strength. Reducing the proportion of EC to SOF appears to improve the quality of lubricant loaded with the soot. The effects of soot properties on the formation of boundary films and thus on the ability of soot-laden lubricant to prevent wear has been described in SAE 2002-01-2793 (Devlin et al, "Film Formation Properties of Polymers in the Presence of Abrasive Contaminants"). In this paper the wear in heavy-duty diesel engines is correlated to the formation of boundary layer films, whose presence is detected using a High Frequency Reciprocating Rig (HFRR).

The additive described herein improves soot particle quality as evidenced by the measure of boundary-layer film thickness in a first comparative study. Lubricating oils containing different amounts of soot generated with and without the manganese-containing additive (MMT) were tested in the HFRR. The treat rate of manganese-containing additive in these tests was 10 mg-Mn/liter. The results were as follows:

TABLE I

Effect of Soot on Boundary Film Formation Properties of Lubricants (1)

| Lubricant | +3% Soot Formed from fuel without MMT | +3% Soot Formed from fuel with MMT | +6% Soot Formed from fuel without MMT | +6% Soot Formed from fuel with MMT |
|---|---|---|---|---|
| Group II Base Oil + ZDDP | 41 +/− 15 | 69 +/− 8 | 3 +/− 2 | 33 +/− 3 |
| Group II Base Oil + Low Molecular Weight Functionalized Olefin Copolymer (2) | 37 +/− 5 | 71 +/− 2 | 21 +/− 5 | 55 +/− 4 |
| Group II Base Oil + High Molecular Weight Functionalized Olefin Copolymer (3) | 42 +/− 4 | 75 +/− 4 | 37 +/− 3 | 79 +/− 5 |

(1) These fluids were examined since the additives in these fluids are those that form boundary films (see 2003-01-2793). The higher the test result the better the ability of the fluid to form a boundary film in the presence of soot.
(2) See U.S. Pat. No. 5,075,383
(3) See U.S. Pat. No. 6,107,257

In a second comparative test, lubricating oils containing equal amounts of soot but varying treat rates of manganese-containing additive were tested in the HFRR. The soot load in the test samples was 6% mass. The results were as follows:

TABLE II

Effect of Soot formed by fuels containing different amounts of Mn on Boundary Film Formation Properties of Lubricants (1)

| Lubricant | +6% Soot Formed from fuel without MMT | +6% Soot Formed from fuel containing 3 mg-Mn/L | +6% Soot Formed from fuel containing 10 mg-Mn/L | +6% Soot Formed from fuel containing 20 mg-Mn/L |
|---|---|---|---|---|
| Group II Base Oil + ZDDP | 4 +/− 2 | 39 +/− 2 | 39 +/− 5 | 42 +/− 10 |
| Group II Base Oil + Low Molecular Weight Functionalized Olefin Copolymer (2) | 30 +/− 1 | 62 +/− 8 | 60 +/− 2 | 68 +/− 1 |
| Group II Base Oil + High Molecular Weight | 12 +/− 4 | 71 +/− 3 | 59 +/− 3 | 68 +/− 1 |

TABLE II-continued

Effect of Soot formed by fuels containing different amounts of Mn on Boundary Film Formation Properties of Lubricants (1)

| Lubricant | +6% Soot Formed from fuel without MMT | +6% Soot Formed from fuel containing 3 mg-Mn/L | +6% Soot Formed from fuel containing 10 mg-Mn/L | +6% Soot Formed from fuel containing 20 mg-Mn/L |
|---|---|---|---|---|
| Functionalized Olefin Copolymer (3) | | | | |

(1) These fluids were examined since the additives in these fluids are those that form boundary films (see 2003-01-2793). The higher the test result the better the ability of the fluid to form a boundary film in the presence of soot.
(2) See U.S. Pat. No. 5,075,383
(3) See U.S. Pat. No. 6,107,257

As can be seen in the tables, the film thickness was improved (higher) in every case when the MMT additive was used. Accordingly, the operation of diesel fuel combustion engines using the fuel additive is enhanced with lower fuel consumption, lower friction (enhanced wear inhibition), and enhanced lubricant oil life (extended length of time between oil changes).

The terms "complex" or "complexing" are intended herein to describe the combination of or reaction by the manganese containing compound with the combustion byproduct(s) such as poisons, soot and other particulates. The combination includes covalent or ionic reactions or any other binding of the metal compound with the combustion byproduct. Further, the term "combustion byproduct" includes, but is not limited to, particulates, soot, unburned soot, uncombusted hydrocarbons, partially-combusted hydrocarbons, combusted hydrocarbons, oxides of nitrogen and sulfur, and any other gas, vapor, particle or compound that results from the combustion of a fuel.

Reference is also made throughout of the term "enhanced" in the context of operation of diesel fuel combustion systems. The term "enhanced" means an improvement in the operation of the diesel fuel combustion system relative to the operation of a similar system that does not have a manganese compound combusted in it. "Enhanced" operation includes, but is not limited to, increased diesel engine lubricating oil life, and reduced engine wear and fuel consumption.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as formation of the organometallic compound) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations or immediately thereafter is thus wholly immaterial for an accurate understanding and appreciation of this disclosure and the claims thereof.

At numerous places throughout this specification, reference has been made to a number of U.S. patents, published foreign patent applications and published technical papers. All such cited documents are expressly incorporated in full into this disclosure as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Applicant does not intend to dedicate any disclosed embodiments to the public, and to the extent any disclosed modifications or alterations may not literally fall within the scope of the claims, they are considered to be part of the invention under the doctrine of equivalents.

What is claimed is:

1. A method of enhancing the operation of a diesel fuel combustion system, the method comprising:

supplying a diesel fuel to a diesel fuel combustion chamber in a diesel fuel combustion system, wherein the diesel fuel comprises an additive that includes a manganese-containing compound, wherein the manganese-containing compound is an organometallic compound selected from the group consisting of alcohols, aldehydes, ketones, esters, anhydrides, sulfonates, phosphonates, chelates, phenates, crown ethers, naphthenates, carboxylic acids, amides, acetyl acetonates and mixtures thereof;

combusting the fuel in the combustion chamber to produce at least one byproduct comprising the manganese-containing compound;

the manganese-containing compound being supplied in an amount effective to complex with the at least one combustion byproduct, wherein the diesel fuel combustion system comprises an engine oil and the engine oil has at least 3% mass, soot loading;

whereby the diesel fuel combustion system performance is enhanced wherein the enhancement is selected from the group consisting of increased diesel engine lubricating oil life, reduced engine wear, and reduced fuel consumption.

2. The method described in claim 1, wherein the diesel fuel is selected from the group consisting of diesel fuel, biodiesel, biodiesel-derived fuel, and synthetic diesel fuel, and mixtures thereof.

3. The method described in claim 1, wherein the diesel fuel contains less than about 30 ppm of sulfur.

4. The method described in claim 1, wherein the manganese-containing compound comprises about 5 to about 30 mgMn/liter of the fuel.

5. The method described in claim 1, wherein the combustion byproduct is selected from the group consisting of particulates, soot, unburned soot, uncombusted hydrocarbons, partially-combusted hydrocarbons, combusted hydrocarbons, and oxides of nitrogen and sulfur.

6. The method described in claim 1, wherein the diesel fuel combustion system comprises one or more of the following components:

exhaust gas recirculation systems, either hot or cooled; variable-scroll turbochargers/variable geometry turbochargers; common-rail fuel injection systems; hydraulically-activated electronically-controlled unit injectors; turbocharged and after cooled combustion air systems; elevated mean fuel injection pressure and injection rate shaping capable systems; electronic engine control systems for combustion air, fuel and exhaust; variable valve actuation systems; homogenous charge compression ignition systems; and low friction coatings on engine surfaces.

7. A method as described in claim 1, wherein the engine oil is formulated to accommodate at least 3% mass, soot loading.

8. A method as described in claim 1, wherein the engine oil is formulated to prevent wear in the presence of at least 3% mass, soot loading as categorized by API CH-4 engine tests.

9. A method as described in claim 1, wherein the engine oil has at least 6% mass, soot loading.

10. A method of enhancing the operation of a diesel fuel combustion system, the method comprising:

supplying a diesel fuel to a diesel fuel combustion chamber in a diesel fuel combustion system, wherein the diesel fuel comprises an additive that includes a manganese-containing compound, wherein the manganese-containing compound is an inorganic manganese compound selected from the group consisting of fluorides, chlorides, bromides, iodides, oxides, nitrates, sulfates, phosphates, nitrides, hydrides, hydroxides carbonates and mixtures thereon;

combusting the fuel in the combustion chamber to produce at least one byproduct comprising the manganese-containing compound;

the manganese-containing compound being supplied in an amount effective to complex with the at least one combustion byproduct, wherein the diesel fuel combustion system comprises an engine oil and the engine oil has at least 3% mass, soot loading;

whereby the diesel fuel combustion system performance is enhanced wherein the enhancement is selected from the group consisting of increased diesel engine lubricating oil life, reduced engine wear, and reduced fuel consumption.

11. The method described in claim 10, wherein the diesel fuel is selected from the group consisting of diesel fuel, biodiesel, biodiesel-derived fuel, and synthetic diesel fuel, and mixtures thereof.

12. The method described in claim 10, wherein the diesel fuel contains less than about 30 ppm of sulfur.

13. The method described in claim 10, wherein the manganese-containing compound comprises about 5 to about 30 mgMn/liter of the fuel.

14. A method as described in claim 10, wherein the engine oil has at least 6% mass, soot loading.

15. The method described in claim 10, wherein the combustion byproduct is selected from the group consisting of particulates, soot, unburned soot, uncombusted hydrocarbons, partially-combusted hydrocarbons, combusted hydrocarbons, and oxides of nitrogen and sulfur.

16. The method described in claim 10, wherein the diesel fuel combustion system comprises one or more of the following components:

exhaust gas recirculation systems, either hot or cooled; variable-scroll turbochargers/variable geometry turbochargers; common-rail fuel injection systems; hydraulically-activated electronically-controlled unit injectors; turbocharged and after cooled combustion air systems; elevated mean fuel injection pressure and injection rate shaping capable systems; electronic engine control systems for combustion air, fuel and exhaust; variable valve actuation systems; homogenous charge compression ignition systems; and low friction coatings on engine surfaces.

* * * * *